Jan. 12, 1954
E. B. MILLER
2,665,974
APPARATUS FOR THE RECOVERY OF ELEMENTAL
SULFUR IN LIQUID FORM FROM GASES
CONTAINING HYDROGEN SULFIDE
Original Filed March 12, 1951
7 Sheets-Sheet 1
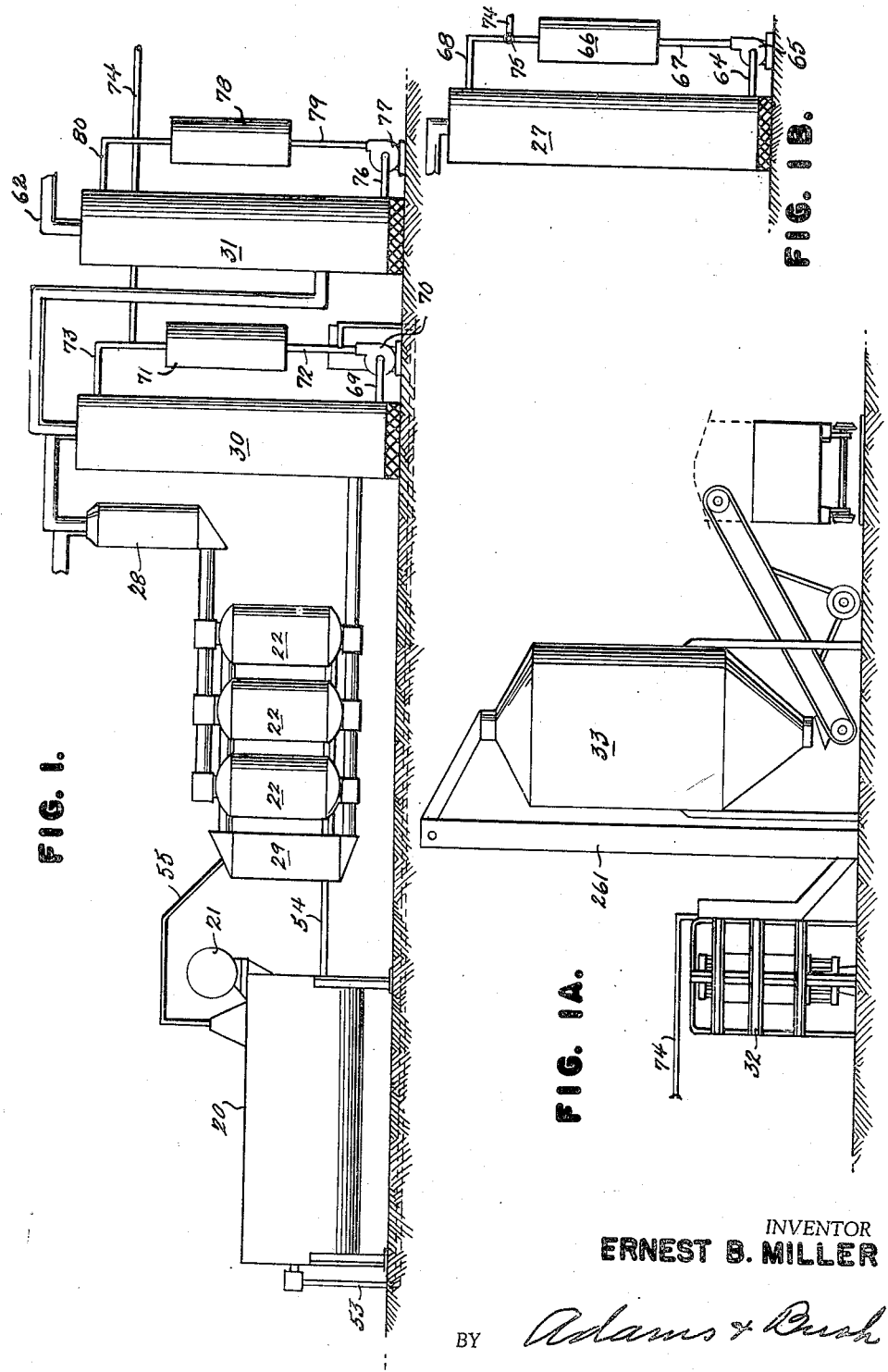
INVENTOR
ERNEST B. MILLER
BY *Adams & Bush*
ATTORNEYS

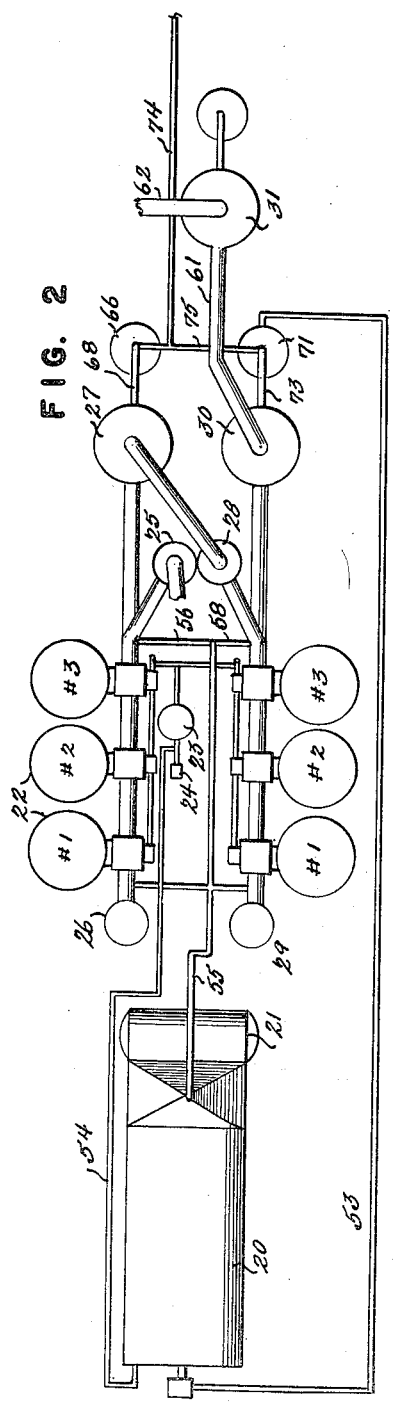
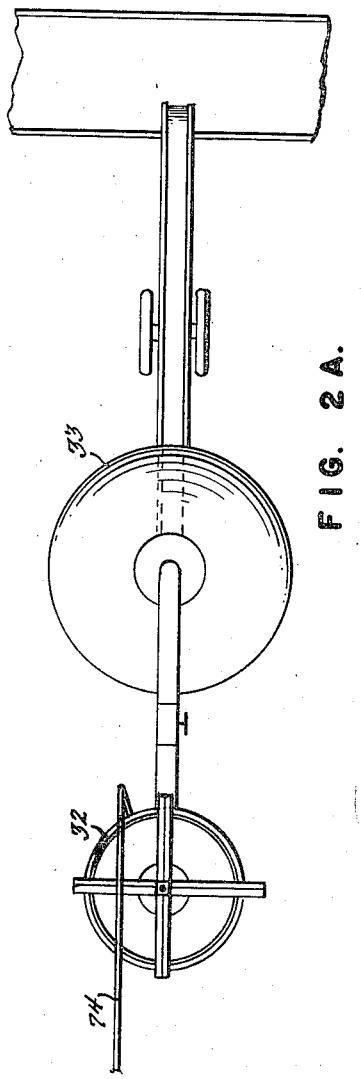
INVENTOR
ERNEST B. MILLER

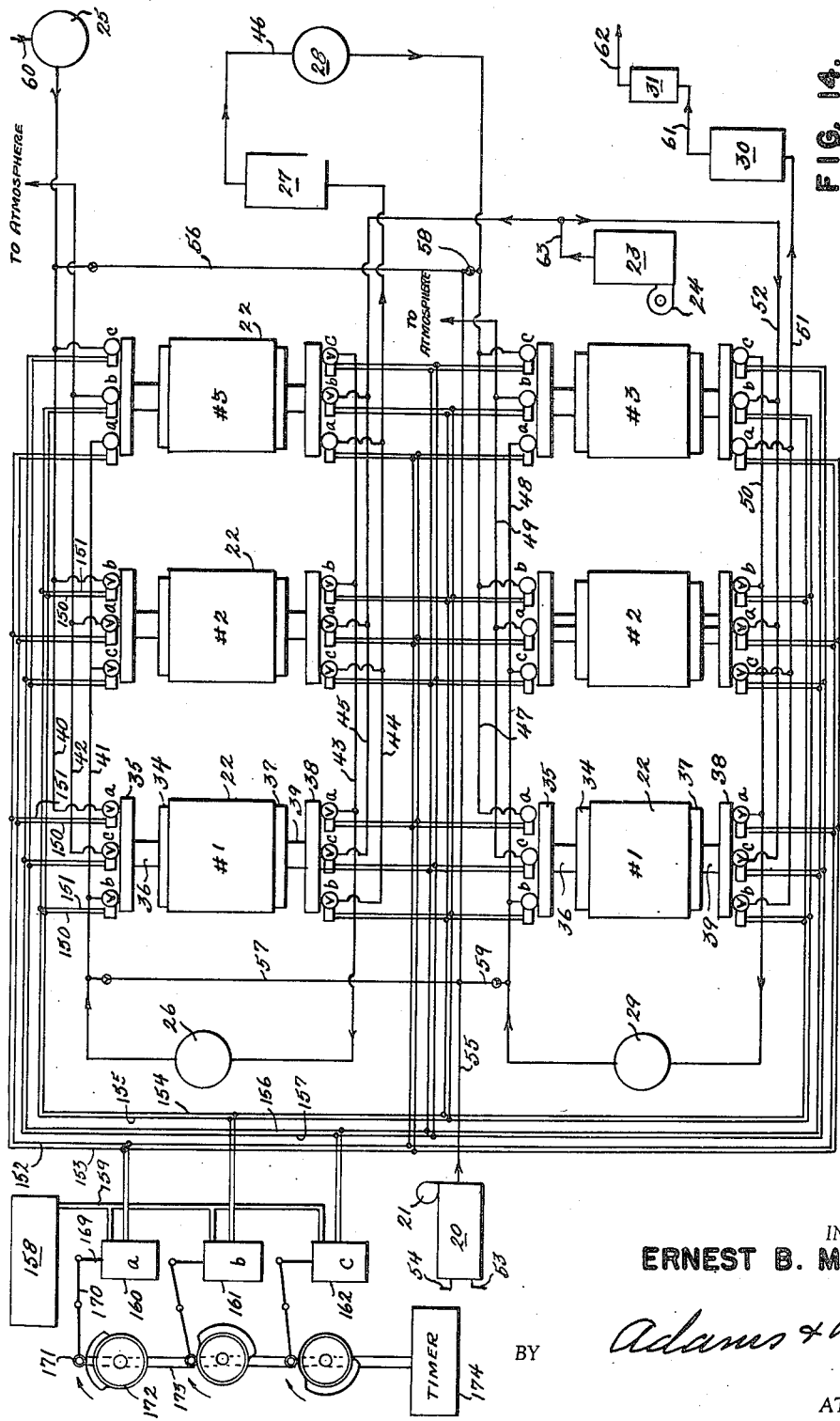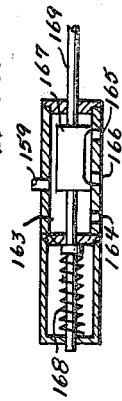
Jan. 12, 1954    E. B. MILLER    2,665,974
APPARATUS FOR THE RECOVERY OF ELEMENTAL
SULFUR IN LIQUID FORM FROM GASES
CONTAINING HYDROGEN SULFIDE
Original Filed March 12, 1951    7 Sheets-Sheet 3
INVENTOR
ERNEST B. MILLER
BY Adams & Bush
ATTORNEYS

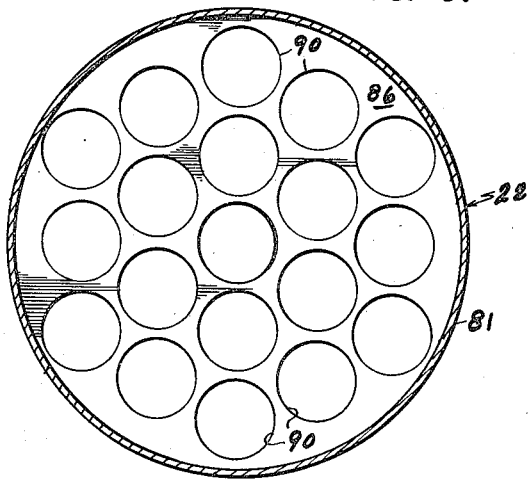
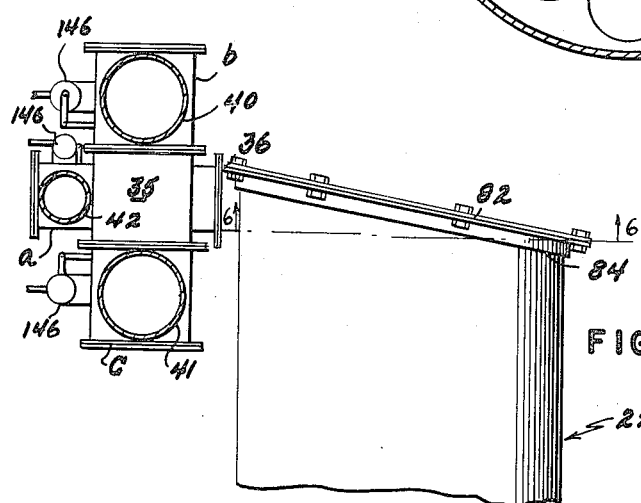
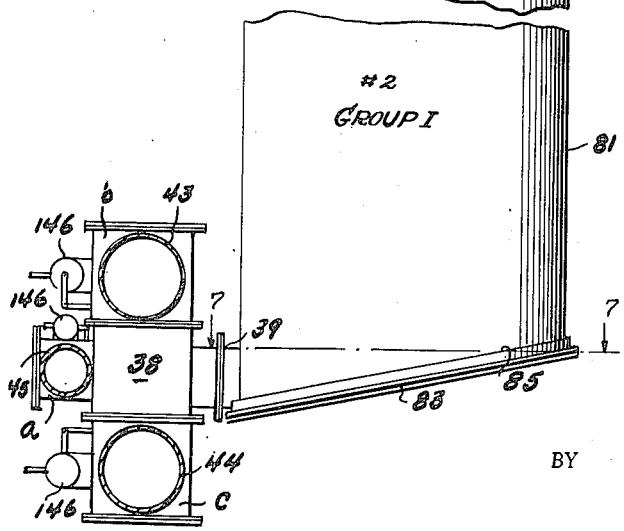
FIG. 6.
FIG. 4.
INVENTOR
ERNEST B. MILLER

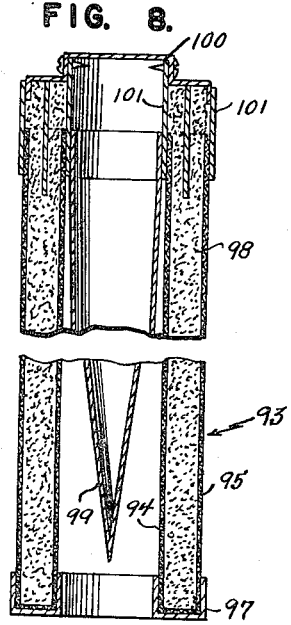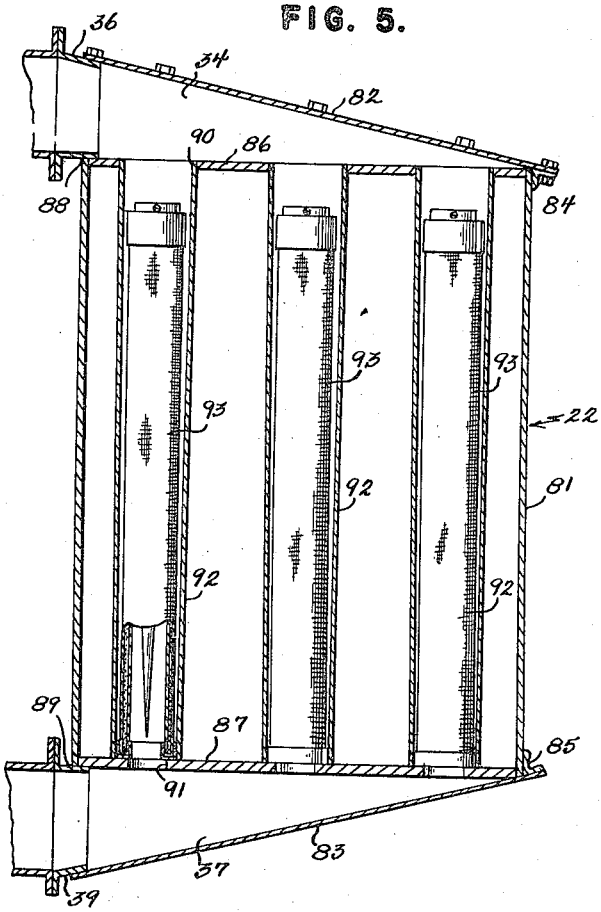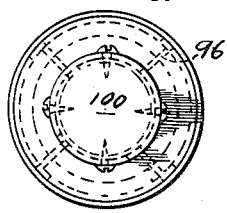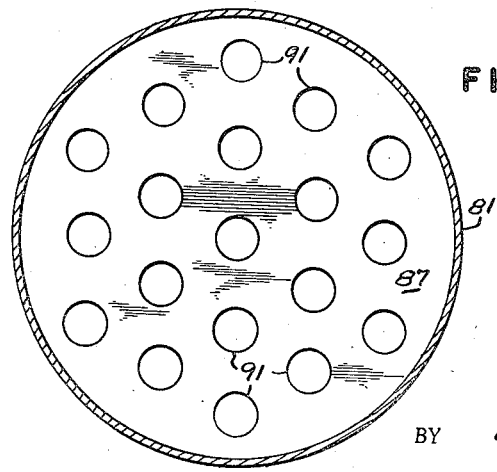

Jan. 12, 1954

E. B. MILLER 2,665,974

APPARATUS FOR THE RECOVERY OF ELEMENTAL
SULFUR IN LIQUID FORM FROM GASES
CONTAINING HYDROGEN SULFIDE

Original Filed March 12, 1951

INVENTOR
ERNEST B. MILLER

BY *Adams & Buch*

ATTORNEYS

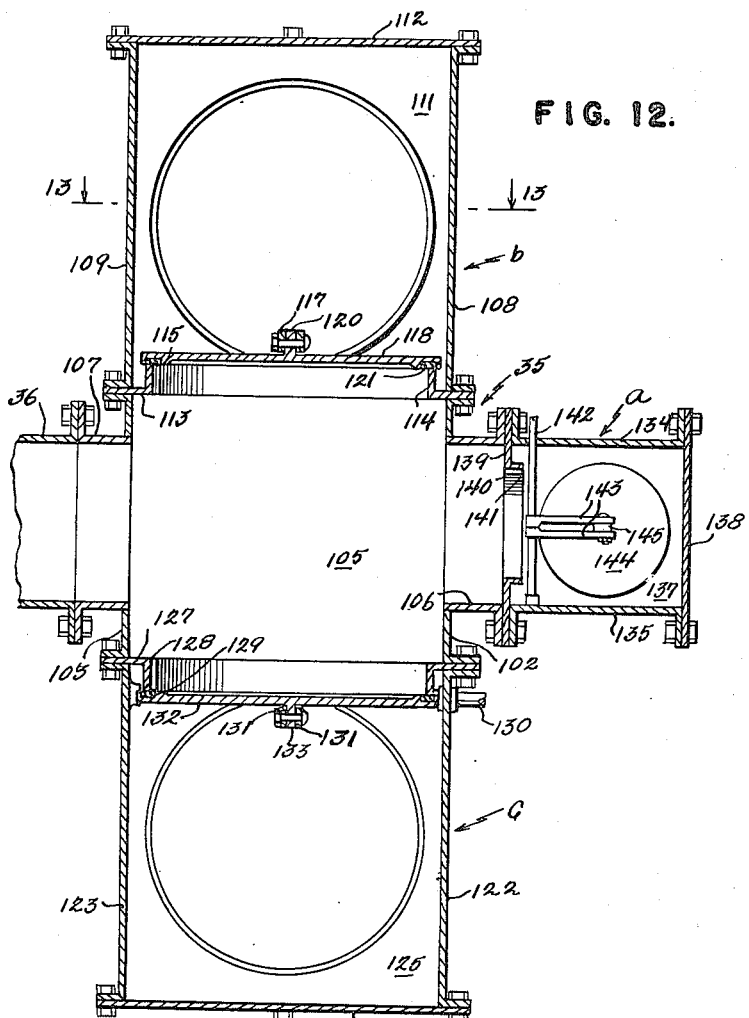
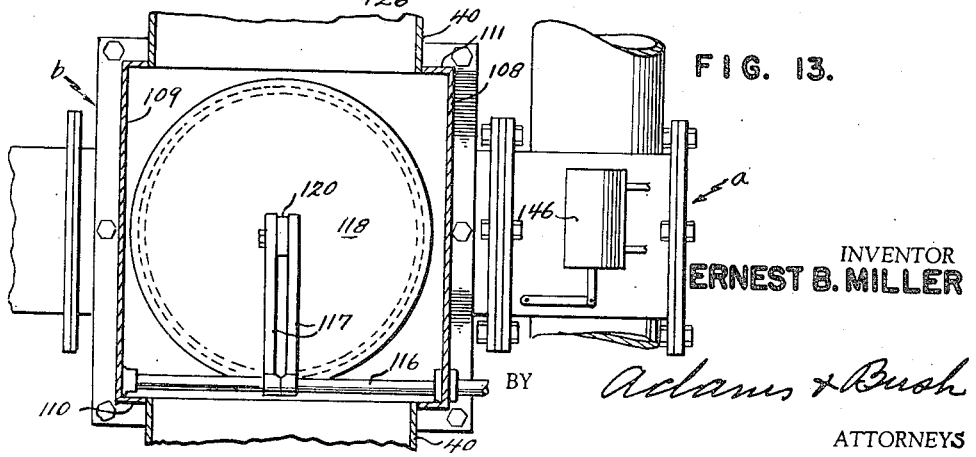
FIG. 12.
FIG. 13.
INVENTOR
ERNEST B. MILLER

Patented Jan. 12, 1954

2,665,974

UNITED STATES PATENT OFFICE 2,665,974

APPARATUS FOR THE RECOVERY OF ELEMENTAL SULFUR IN LIQUID FORM FROM GASES CONTAINING HYDROGEN SULFIDE

Ernest B. Miller, Houston, Tex., assignor to Jefferson Lake Sulphur Company, New Orleans, La., a corporation of New Jersey Original application March 12, 1951, Serial No. 215,178, now Patent No. 2,630,374, dated March 3, 1953. Divided and this application May 13, 1952, Serial No. 287,451

4 Claims. (Cl. 23—262)

This invention relates to the recovery of sulphur from gases containing sulphur compounds and has more particular reference to apparatus for the recovery of elemental sulphur in liquid form from gases containing hydrogen sulphide.

The object of the present invention is to provide a novel apparatus for the recovery of elemental sulphur from gases containing $H_2S$ by catalytically desulphurizing the gas to obtain liquid sulphur.

Another object of the invention is to provide a novel system for the continuous recovery of elemental sulphur from gases containing $H_2S$ in which a catalyst is used which is able to effect a highly efficient conversion of $H_2S$ to $H_2O$ and sulphur and in which the catalyst, after it has become spent, due to chemical reduction of the catalytic agent or the deposition of carbon or other contaminant from the gas being treated, may be fully restored to its initial efficiency by reactivation with a hot reactivating medium such as hot air.

Another object of the invention is to provide a system, as characterized above, wherein a series of at least three reactors are employed and the gas to be treated passes in succession through at least two reactors in the series before being scrubbed, and wherein a regenerating medium is passed through the third reactor in the series and wherein automatic control means are provided for shifting the flow through the reactors so that the last flow of the gas will be through the reactor with the freshest catalyst and the first flow of the gas will be through the reactor with the most spent catalyst.

Another object of the invention is to provide a novel system for the continuous recovery of elemental sulphur from gases containing $H_2S$, as characterized above, wherein the temperature rise in each oxidation stage is controlled by controlling the supply of oxidation gas to such stages.

Another object of the invention is to provide a novel system for the continuous recovery of elemental sulphur from gases containing $H_2S$, as characterized above, wherein a portion of the liquid sulphur being recovered is returned to a sulphur burner, where it is burned to supply the oxidant required to oxidize the $H_2S$ in the gas being processed.

Other objects and advantages of the invention will appear in the following specification when considered in connection with the accompanying drawings, wherein:

Figs. 1 and 1A are diagrammatic elevational views of apparatus embodying the invention, Fig. 1A being a continuation of Fig. 1;

Fig. 1B is a detail elevational view of the first scrubbing tower with its appurtenances;

Figs. 2 and 2A are plan views of the apparatus shown in Figs. 1 and 1A, Fig. 2A being a continuation of Fig. 2;

Fig. 3 is a diagrammatic view showing the flow of the gas to be treated, the flow of the oxidant, and the flow of the regenerating medium through the reactors;

Fig. 4 is a side view, with parts broken away, of a reactor showing the manner in which it is connected to the upper and lower headers;

Fig. 5 is a vertical sectional view, with parts omitted, of the reactor shown in Fig. 4;

Fig. 6 is a sectional view taken on the line 6—6 of Fig. 4;

Fig. 7 is a sectional view taken on the line 7—7 of Fig. 4;

Fig. 8 is a vertical sectional view, with parts broken away, of a tubular container;

Fig. 9 is a plan view of the tubular container shown in Fig. 8;

Fig. 12 is a vertical sectional view through the multi-valve seat box fitting connected to #2 reactor of group 1, and the outlet (inlet) valve boxes $a$, $b$, $c$ connected thereto, taken on the line 12—12 of Fig. 10;

Fig. 13 is a horizontal sectional view taken on the line 13—13 of Fig. 12; and

Fig. 14 is a vertical sectional view of one of the D valves shown in Fig. 3.

Figure 10:
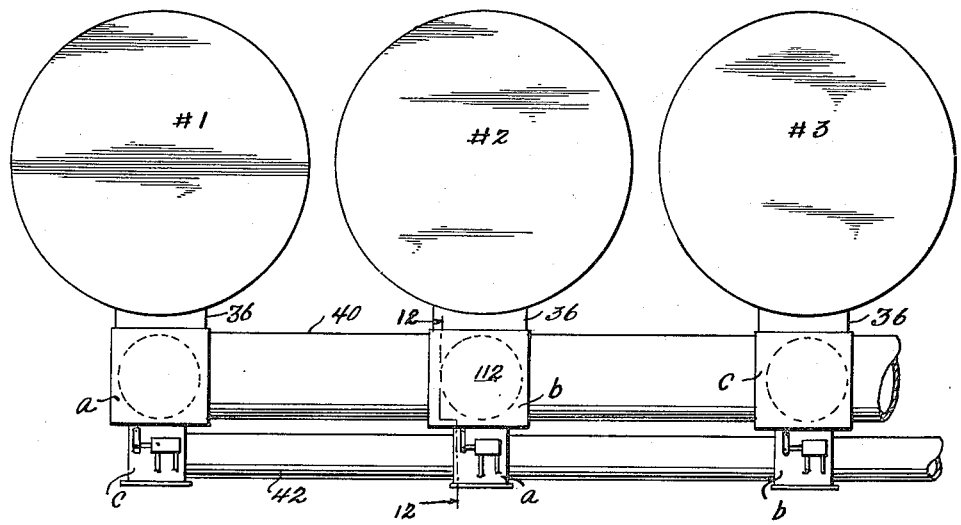
Fig. 10 is a plan view of one group of reactors.

This application is a division of my pending application Ser. No. 215,178, filed March 12, 1951, for Method of and Apparatus for the Recovery of Elemental Sulphur in Liquid Form from Gases Containing Hydrogen sulphide, and the Conversion of the Liquefied Sulphur into Solidified Flakes, now Patent No. 2,630,374.

In general, the invention comprises apparatus for the catalytic desulphurization of acidic gases such as gases containing $H_2S$ and/or $CS_2$, and the recovery of elemental sulphur therefrom in liquid form.

For the purpose of illustration, the invention will be described in connection with the catalytic desulphurization of sour natural gas and the recovery of elemental sulphur therefrom in liquid form.

Referring now to the drawings, there is shown in Figs. 1 and 2, one embodiment of apparatus and the arrangement thereof constructed in accordance with this invention. The apparatus shown includes a sulphur burner 20 in which a mixture of liquid sulphur and air is burned to produce a gas of combustion having as high an $SO_2$ content as possible, preferably 19%–20%; a waste heat boiler 21 which utilizes the heat of the gases of combustion in the sulphur burner to generate steam for running auxiliary machinery and other purposes; a plurality of catalytic reactors 22 (six such being shown as formed into two groups with three reactors in each group); a heater 23 for heating the air used to regenerate the catalyst in the reactors; a fan 24 for supplying air under pressure to the heater 23 and the sulphur burner; a pre-heater 25 for heating the sour gas to be treated prior to its entrance into the first group of reactors; a heat exchanger or intercooler 26 for adjusting the temperature of the sour gas prior to its passage through the second oxidation stage of the first group of reactors; a first scrubbing tower 27 for separating the liquid sulphur from the treated gas; a second pre-heater 28 for heating the sour gas after its passage through the first scrubbing tower and prior to its passage through the second group of reactors; a second heat exchanger or intercooler 29 for adjusting the temperature of the sour gas prior to its passage through the second oxidation stage of the second group of reactors; a second scrubbing tower 30 for completing the separation of the elemental liquid sulphur from the treated sour gas; and a water scrubbing tower 31 where the water vapor and remaining traces of sulphur vapor in the treated gas are removed. A sulphur cooling and flaking machine 32, such as disclosed in my pending application Ser. No. 215,180, filed March 12, 1951, for Method of and Apparatus for Making Flake Sulphur, now Patent No. 2,629,895, may be employed for solidifying and forming the liquid sulphur into sulphur flakes, to be subsequently stored in a storage hopper 33.

There is shown in diagrammatic form in Fig. 3, a reactor arrangement, and particularly a system employing six reactors which have been formed into two groups, with the reactors in each group marked #1, #2, #3, for purposes of identification.

The six reactors are identical in construction and, in general, each comprises a cylindrical chamber in which catalyst in granular form is contained in tubular containers. Each reactor is shown as having an upper manifold 34 connected to an upper multi-damper seat box 35 by a connecting fitting or nipple 36, and a lower manifold 37 connected to a lower multi-damper seat box 38 by a connection fitting or nipple 39.

The upper multi-damper seat boxes 35 of reactors #1, #2 and #3 of the first group of reactors are connected to (1) outlet (inlet) damper box fittings a, b and c, respectively, mounted in an upper gas conduit or header 40; (2) outlet (inlet) damper box fittings b, c and a, respectively, mounted in a second upper gas conduit or header 41; and (3) to outlet (inlet) damper box fittings c, a and b, respectively, mounted in an upper hot air conduit or header 42. In like manner, the lower multi-damper seat boxes 38 of reactors #1, #2, and #3 of the first group of reactors are connected to (1) outlet (inlet) damper box fittings a, b and c, respectively, mounted in a lower gas conduit or header 43; (2) outlet (inlet) damper box fittings b, c and a, respectively, mounted in a second lower gas conduit or header 44; and (3) to outlet (inlet) damper box fittings c, a and b, respectively, mounted in a lower hot air conduit or header 45.

The upper gas header 40 is connected at one end to the first pre-heater 25 and has its other end closed. The upper gas header 41 is connected at one end to a heat exchanger 26 and has its other end closed. The upper hot air header 42 is closed at one end and is open to the atmosphere at the other end.

The lower gas header 43 is connected at one end to the heat exchanger 26 and its other end closed. The lower gas header 44 is connected at one end to the first scrubbing tower 27 and has its other end closed. The lower hot air header 45 is closed at one end and has its other end connected to the hot air heater 23. The first scrubbing tower 27 is connected to the second pre-heater 28 by a conduit 46.

The upper multi-damper seat boxes 35 of the reactors #1, #2 and #3 of the second group of reactors are connected to (1) outlet (inlet) damper box fittings a, b and c, respectively, mounted in an upper gas conduit or header 47; (2) outlet (inlet) damper box fittings b, c and a, respectively, mounted in a second upper gas conduit or header 48; and (3) to outlet (inlet) damper box fittings c, a and b, respectively, mounted in an upper hot air conduit or header 49. In like manner, the lower multi-valve damper boxes 38 of the reactors #1, #2 and #3 of the second group of reactors are connected to (1) outlet (inlet) damper box fittings a, b and c, respectively, mounted in a lower gas conduit or header 50; (2) outlet (inlet) damper box fittings b, c and a, respectively, mounted in a second lower gas conduit or header 51; and (3) to outlet (inlet) damper box fittings c, a and b, respectively, mounted in a lower hot air conduit or header 52.

The upper gas header 47 is connected at one end to the second pre-heater 28 and has its other end closed. The upper gas header 48 is connected at one end to the heat exchanger 29 and has its other end closed. The upper hot air header 49 is closed at one end and is open to the atmosphere at the other end. The lower gas header 50 is connected at one end to the heat exchanger 29 and has its other end closed. The lower gas header 51 is connected at one end to the second scrubbing tower 30 and has its other end closed. The lower hot air header 52 is closed at one end and has its other end connected to the hot air heater 23.

Each of the conduits or headers 40, 41, 42, 43, 44, 45, 47, 48, 49, 50, 51 and 52 are made up of pipe sections and outlet (inlet) damper boxes suitably connected together in a manner hereinafter to be described.

While any suitable sulphur liberating gas or oxidant may be used, preferably and illustratively, $SO_2$ is employed and is supplied by the sulphur burner 20.

The sulphur burner 20 and the waste heat boiler 21 may be of any suitable type. The burner 20 is shown as having a liquid sulphur supply pipe line 53 connected to supply liquid sulphur to the burner from the second scrubbing tower, and an air supply pipe line 54 connected to the hot air blower 24 for supplying air under pressure to the burner. A conduit or header 55, having valved branch conduits 56, 57, 58 and 59 connected thereto, is connected to the exhaust stack of the sulphur burner for supplying $SO_2$ to the reactors. The valved branch conduits 56 and 57 are connected to the upper gas headers 40 and 41, respectively, of the first group of reactors; the valved branch conduits 58 and 59 are connected to the upper gas headers 47 and 48, respectively, of the second group of reactors.

While the SO₂ produced in the sulphur burner would be composed of approximately 19%-20% of SO₂, the remainder would be nitrogen. This nitrogen, of course, would remain in the treated gas and be a dilutant to the gas. If this would be objectionable, there could be provided a concentrated SO₂ by selectively adsorbing the SO₂ from the above-mentioned 20% SO₂ mixture in a silica gel adsorber or equivalent apparatus and recovering the adsorbed SO₂ in concentrated form.

The system shown is designed to provide for continuous operation with two stage oxidation in each group of reactors. This is accomplished in each group by mixing a predetermined amount of gas to be treated with a predetermined proportion of an oxidant or sulphur liberating gas, illustratively SO₂, and continuously directing the resultant gas mixture at an optimum pre-reaction temperature into a first selected reactor, for example #1. As the gas mixture comes into intimate contact with the catalyst therein, the 1st oxidation stage takes place and at least a portion of the contained H₂S is oxidized to elemental sulphur vapor with the liberation of heat, mixing a predetermined amount of the treated gas mixture with an additional predetermined proportion of sulphur liberating gas, illustratively SO₂, and continuously directing the resultant gas mixture at an optimum pre-reaction temperature through a second selected reactor, for example #3 (2nd oxidation stage). As the gas mixture comes into contact with the catalyst therein, the 2nd oxidation stage takes place and a further portion of the contained H₂S is oxidized to elemental sulphur vapor with the liberation of heat. At the same time, a regenerating medium, such as hot air, is being passed through the third reactor #2 (activation stage). As soon as the catalyst in the reactor forming the first oxidation stage (#1 in the present example) is spent to a predetermined amount, the flow of gas and the regenerating medium through the reactors is shifted, so that the first passage of the gas to be treated is shifted to reactor #3, the last passage of the gas to be treated is shifted to reactor #2, while the flow of the regenerating medium is shifted to reactor #1. As soon as the catalyst in reactor #3 is spent to a predetermined amount, the flow of the gas and the regenerating medium through the reactors is automatically shifted to cause the first passage of the gas to be treated to be through reactor #2, the last passage of the treated gas to be through reactor #1, and the passage of the regenerating medium to be through reactor #3. This cycle of shifting the flow of the gas and the regenerating medium through the reactors in each group is continuous during the operation of the system. Thus, each reactor in succession is last in the oxidation phase (second oxidation stage), is then first in the oxidation phase (first oxidation stage), and finally is on the activating phase. It should be noted that in each group of reactors the last passage of the gas (second oxidation stage) is always through the reactor having the freshest catalyst therein, and the flow of the regenerating medium is always through the reactor having the most spent catalyst therein. At each shift each reactor moves one step or phase in the cycle.

In connection with the foregoing, it will be noted that the arrangement and manner in which the outlet (inlet) damper box fittings $a$, $b$ and $c$ of the headers are connected to the upper and lower multi-damper seat boxes of the reactors in each group of reactors is such that in each step or phase of the cycle all of the dampers of one group bearing the same letter are open, while all of the dampers of the remaining two groups bearing the same letter are closed. In other words, the relation of the dampers in the three phases of each cycle are as follows: first phase, all $a$ dampers are open, all $b$ and $c$ dampers are closed; second phase, all $c$ dampers are open, all $a$ and $b$ dampers closed; and, third phase, all $b$ dampers are open, all $a$ and $c$ dampers closed. The control mechanism for opening and closing all of the $a$, $b$ and $c$ dampers in accordance with a predetermined time pattern, will hereinafter be described.

The flow of the gas to be treated, the flow of the medium for regenerating the catalyst in the reactors, and the flow of the SO₂ will now be described with reference to the reactor arrangement, as shown diagrammatically in Fig. 3. By way of example, it will be assumed that the selective control mechanism for opening and closing the dampers $a$, $b$ and $c$ in all of the headers have operated to close all of the $b$ and $c$ dampers and to open all of the $a$ dampers in all of the headers.

The sour gas to be desulphurized is delivered, under suitable pressure of from about 5 to 10 pounds per square inch gauge, from a source of supply (not shown) to the 1st pre-heater 25, by means of a pipe line or conduit 60. The gas is heated in the pre-heater to an optimum pre-reaction temperature and then passes into the upper gas header 40 where it is mixed with a predetermined proportion of sulphur liberating gas or oxidant illustratively SO₂. From the upper gas header 40, the gas mixture passes through outlet damper box $a$, upper multi-damper seat box 35, and nipple 36 into the upper manifold 34 of reactor #1 of the first group. From the manifold, the gas mixture passes downwardly through the tubular beds of catalyst in the reactor, where it comes into intimate contact with the catalyst and an exothermic reaction takes place in which some elemental sulphur is liberated in vapor form, together with steam, in accordance with the following equation:

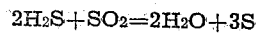

$$2H_2S + SO_2 = 2H_2O + 3S$$

The treated gas passes through the reactor into the lower manifold 37 and from the lower manifold through the nipple connection 39, the lower multi-damper seat box 38 into the inlet damper box $a$ of the lower header 43, through which it passes into the first heat exchanger 26, where its temperature, which has risen in the reactor, is again adjusted to an optimum pre-reaction temperature.

From the first heat exchanger 26, the treated gas passes into the upper gas header 41, where it is mixed with an additional predetermined proportion of SO₂. From the upper gas header 41, the gas mixture passes through outlet damper box $a$, upper multi-damper seat box 35, and nipple 36, into the upper manifold 34 of the reactor #3 of the first group of reactors. From the upper manifold, the gas mixture passes downwardly through the tubular catalyst beds in the reactor and a reaction similar to that which took place in reactor #1 occurs.

The treated gas passed through the reactor into the lower manifold 37 and from the lower manifold through the nipple connection 39, the lower multi-damper seat box 38 into the inlet damper box *a* of the lower header 44, through which it passes to the bottom of the first scrubbing tower 27. The treated gas mixture, including the steam and sulphur vapor formed by the reactions in the reactors rises in the scrubbing tower against a downward flow of molten sulphur, which condenses the sulphur vapor into molten sulphur which collects in the bottom of the scrubbing tower.

From the top of the scrubbing tower 27, the partially desulphurized gas passes through a pipe line or conduit 46 into the second pre-heater 28, where its temperature is adjusted to an optimum pre-reaction temperature.

From the second pre-heater 28, the gas passes into the upper header 47, where it is mixed with a predetermined proportion of sulphur liberating gas ($SO_2$). From the upper header 47 the gas mixture passes through outlet damper box *a*, upper multi-damper seat box 35, and nipple 36, into the upper manifold 34 of reactor #1 of the second group of reactors. From the upper manifold, the gas mixture passes downwardly through the tubular catalyst beds in the reactor and a reaction similar to that which took place in reactor #1 of the first group of reactors occurs. The treated gas passes through the reactor into the lower manifold 37 and from the lower manifold through the nipple connection 39, the lower multi-damper seat box 38 into the inlet damper box *a* of the lower header 50, through which it passes into the second heat exchanger 29, where its temperature, which has risen in the reactor, is again adjusted to an optimum reaction temperature. From the heat exchanger 29, the gas passes into the second upper gas header 48, where it is mixed with an additional predetermined proportion of $SO_2$. From the header 48, the gas mixture passes through outlet damper box *a*, upper multi-damper seat box 35, and nipple 36, into the upper manifold 34 of reactor #3 of the second group of reactors.

From the upper manifold, the gas mixture passes downwardly through the tubular catalyst beds in the reactor and a reaction similar to that which took place in reactor #1 of the first group of reactors occurs. The treated gas mixture passes through the reactor into the lower manifold 37 and from the lower manifold passes through the nipple connection 30, the lower multi-damper seat box 38 into the inlet damper box *a* of the lower header 51, through which it passes into the bottom of the second scrubbing tower 30. The treated gas mixture, from which, in the last two reactors, nearly all of the remaining sulphur has been liberated in the form of elemental sulphur vapor, rises in the scrubbing tower against a downward flow of molten sulphur which condenses the sulphur vapor into molten sulphur, which collects in the bottom of the scrubbing tower. From the top of the scrubbing tower 30, the treated gas passes through pipe line 61 into the bottom of water scrubbing tower 31. The gas rises in the water scrubbing tower 31 against a downward flow of water which washes the final remaining traces of sulphur vapor from the gas. From the top of the water scrubbing tower 31, the now sweet gas is passed through a pipe line 62 to its point of use (not shown).

As shown diagrammatically in Fig. 3, $SO_2$ passes from the sulphur burner 26, through header 55 and valved branch conduits 56, 57, 58 and 59 into the upper gas headers 40, 41, 47 and 48, respectively, where it mixes with the gas in the headers and passes with said gas into the reactors. The branch conduits are provided with valves for regulating the amount of $SO_2$ to be admitted into the gas headers, thus permitting the temperature rise in each oxidation stage to be controlled by controlling the supply of $SO_2$ or oxidation gas to such stages.

As shown diagrammatically in Fig. 3, air for use as the regenerating medium is forced into hot air heater 23 by means of a fan or blower 24. The air is heated to a temperature of about 1000° F. in the heater and, from the heater, passes through pipe line or conduit 63 into the lower hot air headers 45 and 52. From the lower hot air header 45, the hot air passes through outlet damper box *a*, lower multi-damper box seat 38, and nipple connection 39, into the lower manifold 37 of reactor #2 of the first group of reactors. From the manifold, the hot air passes upward through the tubular catalyst beds in the reactor into the upper manifold 34, the hot air reactivating the catalyst in the beds as it passes through. From the upper manifold 34, the hot air passes through nipple connection 36, upper multi-damper seat box 35, and inlet damper box fitting *a* into upper hot air header 42 and through the header 42 to the atmosphere.

From the lower hot air header 52, the hot air passes through outlet damper box *a*, lower multi-damper seat box 38 and nipple connection 39 into the lower manifold 37 of reactor #2 of the second group of reactors. From the lower manifold 37, the hot air passes upwardly through the tubular catalyst beds in the reactor into the upper manifold 34, the hot air reactivating the catalyst in the beds as it passes through. From the upper manifold 34, the hot air passes through nipple connection 36, upper multi-damper seat box 35 and inlet damper box fitting *a* into upper hot air header 49, and through the header 49 to the atmosphere.

While the foregoing description has not been concerned with the utilization of pressurized equipment, this is not a limitation. Some pressure will be required on the system to overcome the back pressure due to friction. Pressure above this limitation is not necessary to successful operation. On the other hand, by allowing for the differential pressure, a reasonable increase in the over-all operating pressures will permit handling larger gas volumes in an apparatus of fixed size.

The present method is contrived to recover a major portion of the contained sulphur in the sour gas in a multi-stage oxidation process without raising the reaction temperature in any stage above about 830° F. by adjusting the temperature of the admixture of the gas to be treated and the sulphur liberating gas, illustratively $SO_2$, to an optimum pre-reaction temperature in the range of from about 375° F. to about 600° F. prior to the entry of the admixture into each of the stages or reaction zones and controlling the amount of $SO_2$ admitted into each stage or reaction zone. However, it is contemplated that substantial portions of the contained sulphur may be removed in the respective stages when employing pre-reaction temperatures up to about 800° F., while controlling the reaction temperatures in the stages so that they do not exceed about 1000° F. in any stage. It will be understood, however, that at higher reaction temperatures than above 830° F., the efficiency of the conversion will be reduced. Therefore, it is highly preferable to practice the method at relatively low reaction temperatures.

As a specific example, assume that the raw gas to be treated contains 125 lbs. of $H_2S$ per 4300 cubic feet at a pressure of 10 lbs. gauge and at 100° F. Then, about 30% of the initial $H_2S$ content of the gas can be converted into sulphur vapor in the first oxidation stage of the first group of reactors by pre-heating the gas to about 500° F. and mixing $SO_2$ with the pre-heated gas at the rate of about 30 lbs. of $SO_2$ per minute prior to the entry of the gas into the reactor in which the first oxidation stage occurs. The temperature in the reactor will rise to from about 700° F. to about 750° F.

About 30% of the initial total $H_2S$ content of the gas can be converted into sulphur vapor in the second oxidation stage of the first group of reactors by cooling the gaseous admixture delivered from the first oxidation stage to about 500° F., then mixing $SO_2$ with the cooled gaseous admixture at the rate of about 30 lbs. of $SO_2$ per minute prior to its entry into the reactor in which the second oxidation stage occurs. The temperature in the reactor will rise to from about 680° F. to about 710° F.

About 30% of the initial total $H_2S$ content of the gas can be converted into sulphur vapor in the first oxidation stage of the second group of reactors by pre-heating the gas after its passage through the first scrubbing tower to about 500° F. and mixing $SO_2$ with the pre-heated gas at the rate of about 30 lbs. of $SO_2$ per minute prior to its entry into the reactor in the second group of reactors in which the first oxidation stage occurs. The temperature in the reactor will rise to from about 670° F. to about 700° F. The remaining 10% of the initial total $H_2S$ content of the gas can be converted into sulphur vapor in the second oxidation stage of the second group of reactors by cooling the gaseous admixture delivered from the first oxidation stage to about 500° F., then mixing $SO_2$ with the cooled gaseous admixture at the rate of about 11 lbs. of $SO_2$ per minute prior to its entry into the reactor of the second group of reactors in which the second oxidation stage occurs. The temperature in the reactor will rise to from about 530° F. to about 560° F.

Obviously, with a raw gas having a much lesser $H_2S$ content it will be possible to remove all of the $H_2S$ in the first group of reactors without raising the temperature in either the first or second oxidation stages above a permissible reaction temperature of from about 747° F. to about 830° F.

It is always advisable, however, to do as much oxidation as possible in the first stage, consistent with the above mentioned reaction temperatures, so that it has been found advisable, when treating a gas containing about 15% $H_2S$, to supply oxidant gases to the various stages so as to accomplish about 55% conversion in the first stage, about 25% in the second stage, about 12% in the third stage, and 8% in the last stage. Since, in the earlier stages, the catalytic conversion cannot be completed, the reaction in these stages can be assisted by the presence of an excess of oxidant gas. Thus, to accomplish the illustrative reactions above, it has been found convenient to supply 75% of the total oxidant gas in the first stage and the remaining 25% in the second stage. The excess not used up in either of these stages is carried with the gas being treated, and is available as needed in the last two stages.

In connection with the foregoing, it may be pointed out that, as the boiling point of sulphur is 832° F., a pure sulphur vapor would condense to liquid if cooled below that temperature. In the present method, as above described, there is no concentrated sulphur at any point. In fact, the maximum concentration is about 2%, at which concentration the sulphur vapor will remain in vapor form at the pressures and temperatures employed in the process.

While it is not a necessary feature of the invention, it may be pointed out that, if the liberated sulphur content of the treated gas becomes too high between the first and second oxidation stages of either group of reactors, all or part of it may be removed. This is readily accomplished, for example, by suitable adjustment of the heat exchangers 26 and 29.

The scrubbing towers 27 and 30 may be of any suitable usual type. In the particular embodiment illustrated, molten sulphur is withdrawn from the bottom of the scrubbing tower 27 through pipe line 64 by pump 65 and delivered to a sulphur cooler 66 through a pipe line 67 (see Fig. 1B). From the sulphur cooler 66, the molten sulphur passes through pipe line 68 to the top of the scrubbing tower 27. The molten sulphur cascades downwardly through the scrubbing tower and is brought into intimate contact with the counter-current stream of gas, steam and elemental sulphur vapor rising through the scrubbing tower and condenses the sulphur vapor into molten sulphur which collects in the bottom of the tower. In like manner, molten sulphur is withdrawn from the bottom of the scrubbing tower 30 through a pipe line 69 by a pump 70 and delivered to a sulphur cooler 71 through a pipe line 72 (see Fig. 1). From the sulphur cooler 71, the molten sulphur passes through a pipe line 73 to the top of the scrubbing tower 30 and cascades downwardly through the tower in counter-current flow to the upward flow of gas, steam and sulphur vapor therein and condenses the sulphur vapor which collects in the bottom of the tower. A portion of the molten sulphur being recirculated through the two scrubbing towers is withdrawn through a pipe line 74, which is connected to a cross pipe line 75 connecting the discharge pipe lines 68 and 73 from the sulphur coolers 66 and 71, and delivered, in its molten state, to the sulphur cooling and flaking machine 32, where the liquid sulphur is solidified and formed into flakes.

The water scrubbing tower 31 may be of any suitable usual type. In the particular embodiment illustrated, water is withdrawn from the bottom of the tower 31 through a pipe line 76 by a circulating pump 77, and delivered to a water cooler 78 through a pipe line 79. From the water cooler 78, the water passes through pipe line 80 to the top of the tower 31 and is sprayed into the tower. The gas entering the bottom of the tower 31 passes upwardly in counter-current flow through the water spray. The water spray condenses the water vapor or steam in the gas and removes any traces of sulphur vapor which may be contained therein, leaving the gas sweet to be discharged from the tower through pipe line 62 to its point of use.

The reactors 22 are identical in construction, the details of which are shown in Figs. 4, 5, 6 and 7. As there shown, each reactor comprises a cylindrical tank 81 having a rearwardly and downwardly sloping flat top wall 82 and a rearwardly and upwardly sloping flat bottom wall 83. The top and bottom wall members 82 and 83 are elliptical in outline and are secured, as by bolting, to flange members 84 and 85, respectively, which are secured, as by welding, to the upper and lower peripheries of the cylindrical tank 81. A vertically spaced pair of disc-shaped plates 86, 87 are mounted in the tank 81 with their peripheral edges secured to the wall of the tank, as by welding, to form a gas-tight joint.

The top wall member 82, the upper disc member 86, and the portion of the side wall of the tank therebetween form the upper manifold 34. An opening 88 is formed in the front wall of the upper manifold and the upper flanged connecting fitting or nipple 36 is secured therein, as by welding the inner edges of the rectangular box-like fitting to the edges of the opening 88. The bottom wall member 83, the lower disc member 87, and the portion of the side wall of the tank therebetween form the lower manifold 37. An opening 89 is formed in the front wall of the lower manifold and the lower flanged connecting fitting or nipple 39 is secured therein by welding the inner edges of the rectangular box-like fitting to the edges of the opening 89. The upper disc-shaped member 86 has a plurality of circular openings 90 formed therein, and the lower disc-shaped member 87 has a corresponding number of circular openings 91 formed therein. The openings 90 and 91 in the two disc-shaped members are in vertical alignment, but the openings in the bottom disc-shaped member are of less diameter than the openings in the upper disc-shaped member. A tapered tubular conduit 92, preferably made of sheet metal, extends between each circular opening in the upper disc-shaped member and the corresponding aligned opening in the lower disc-shaped member, with its upper end secured to the peripheral edge of the opening in the upper disc-shaped member and its bottom edge secured to the lower disc-shaped member around the circular openings therein (see Fig. 5).

Mounted within each of the conduits 92 is a tubular catalyst container 93. The catalyst containers 93 are identical in construction and, as best shown in Figs. 8 and 9, each comprises two concentric tubular screens 94, 95 held in spaced apart relation by a plurality of longitudinal radial fins 96 with the annular space between the screens closed at the bottom, as by a flanged annular plate 97. The mesh of the screens is such as to retain a granular catalyst material 98 in the annular space between the screens. Although the invention is not limited thereto, it is preferred to employ a catalyst wherein granular silica gel, or a substance having substantially the same structure, is the carrier for the active material. Oxides of iron, copper, nickel, aluminum and manganese, or mixtures thereof may be employed as the active material. However, oxides of iron are preferred.

Mounted within the inner wire screen 94 is an inverted substantially conically shaped baffle member 99. The baffle member is closed at its apex which extends downwardly to a point near the bottom of the container and has its upper peripheral edge suitably secured to the upper peripheral edge of the screen. Preferably, the baffle member is made of sheet metal. Each container is closed at its top, as by a cap member 100, connected to ring collars 101 secured to the upper end portions of the wire screens 94, 95.

It should be noted that the annular space between the inner wall of the conduit 92 and the outer wall of the conical-shaped baffle member 99 forms an open-ended duct and that the annular bed of catalyst material forms a barrier extending longitudinally across the duct (see Fig. 5).

The diameter of the bases and the taper of the side walls of the members 92 and 99 are such that the cross sectional area of the duct formed between the two members is substantially equal at its top and bottom. The tapers of the side walls of the two members are such that a substantially uniform velocity is obtained on both sides of the barrier as fluid is transferred from the upstream side to the downstream side, regardless of the direction of flow, thereby creating a substantially constant static head over the face of the barrier, resulting in a substantially uniform distribution of the fluid through the entire barrier area. This construction insures a substantially uniform flow of fluid through the silica gel (catalyst material) in the annular containers, whether the flow of fluid is downward, as in the case of the sour gas being treated, or upward, as in the case of the heated activating medium. In connection with the foregoing, it may be pointed out that the annular beds of catalyst material are so thin that they permit velocities of about from 10 to 25 feet per minute through the beds at 60°–70° F. and atmospheric pressure.

Figure 11:
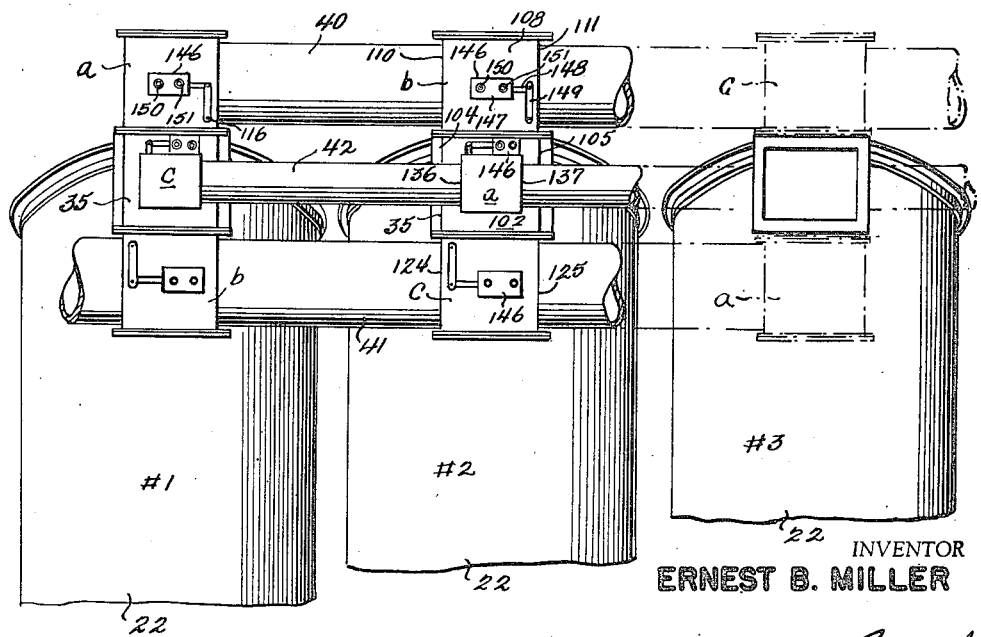
Fig. 11 is a front elevational view, with parts omitted, of the group of reactors shown in Fig. 10.

The construction and arrangement of the upper headers and lower headers and the manner in which they are connected to the upper and lower multi-damper seat boxes of the reactors in each group is identical and such arrangement for the first group of reactors is shown in Figs. 4, 10 and 11. As there shown, the upper gas header 40 is positioned above the upper multi-damper seat boxes 35 with its outlet (inlet) damper boxes $a$, $b$ and $c$ connected to the tops of the multi-damper seat boxes 35 of reactors #1, #2 and #3, respectively. The upper header 41 is positioned below the upper multi-damper seat boxes 35 with its outlet (inlet) damper boxes $a$, $b$ and $c$ connected to the bottom of the multi-damper seat boxes 35 of reactors #3, #1 and #2, respectively (see Fig. 11). The upper hot air header 42 is positioned below the upper header 40 and with its outlet (inlet) damper boxes $a$, $b$ and $c$ connected to the front side of the multi-damper seat boxes 35, as viewed in Figs. 10 and 11, of reactors #2, #3 and #1, respectively. In like manner, the lower gas header 43 is positioned above the lower multi-valve seat box 38 with its outlet (inlet) valve boxes $a$, $b$ and $c$ connected to the tops of the multi-damper seat boxes 38 of reactors #1, #2, #3, respectively. The lower gas header 44 is positioned below the lower multi-damper seat boxes 38 with its outlet (inlet) damper boxes $a$, $b$ and $c$ connected to the bottoms of the multi-damper seat boxes 38 of reactors #3, #1 and #2, respectively (see Figs. 3 and 4). The lower hot air header 45 is positioned below the lower gas header 43 and with its outlet (inlet) damper boxes $a$, $b$ and $c$ connected to the front side of the multi-damper seat boxes 35, as seen in Fig. 4, of reactors #2, #3 and #1, respectively (see Fig. 3).

All of the outlet (inlet) damper boxes $a$, $b$ and $c$ in all of the gas headers are identical in construction and all of the outlet (inlet) damper boxes $a$, $b$ and $c$ in all of the hot air headers are identical in construction. All of the upper and lower multi-damper seat boxes are identical in construction and each is connected to an outlet (inlet) damper box $a$, or $b$, or $c$, of the three upper manifolds or the three lower manifolds, as the case may be, in the same manner.

The details of construction of a multi-damper seat box and the construction and arrangement of the three outlet (inlet) damper boxes connected thereto are shown in Figs. 12, 13 and 14. The particular multi-damper seat box shown in these figures is the upper multi-damper seat box of reactor #2 of the first group of reactors, shown in Figs. 10 and 11. As there shown, the multi-damper seat 35 is formed by front and rear wall members 102, 103, and side wall members 104, 105 secured together along their edges to form a hollow rectangular box-like structure open at its top and bottom. The front and rear wall members have integral outwardly extending flanges formed along their top and bottom edges and are provided with rectangular-shaped openings in which are suitably secured, as by welding, flanged box-like nipples 106, 107. The flanged nipple 107 is secured to the flanged nipple 36 of the reactor, as by having their flanges bolted together to form a gas-tight joint. The outlet (inlet) damper box b, which forms a part of upper gas header 40, is formed by front and rear walls 108, 109, side walls 110, 111, and a top wall 112, secured together to form a hollow rectangular box-like structure open at its bottom. The front and rear walls have aligned outwardly extending flanges formed along their top and bottom edges. The top wall 112 is removably secured to the structure, as by bolting. The side wall members have aligned circular openings formed therein and in each are suitably secured the ends of the sections of the conduit 40 (as shown in Figs. 10 and 11).

The outlet (inlet) damper box b is secured to the top of the multi-damper seat box 35, as by bolting the flanged bottom end of the damper box to the flanged upper end of the damper seat box. A rectangular plate 113 is mounted between the damper box b and the damper seat box 35 with its peripheral edge secured between the connected flanges of the two boxes. The plate 113 has a circular opening 114 formed therein and provided with an upstanding peripheral flange forming a circular damper seat 115. An oscillatable shaft 116 extends transversely of the damper box b with one end journalled in a suitable bearing formed on the rear wall 109 and with its other end extending through a bearing bushing in the front wall 108. The shaft 116 has a longitudinally spaced pair of parallel crank arms 117 rigidly secured thereto. A circular damper member 118 is connected to the ends of the crank arms 117 for limited pivotal movement, as by means of an apertured lug 120 bolted between the ends of the crank arms. The damper member 118 is shown as having a circular gasket 121, preferably made of asbestos and positioned to engage the circular damper seat 115 when the damper member 118 is swung to closed position. The construction is such that the shaft 116, when turned in one direction, will swing the damper member 118 onto the damper seat 115 with the circular gasket 121 tightly engaging the end edges of the seat, and, when turned in the opposite direction, will swing the damper member off the damper seat.

The outlet (inlet) damper box c, which forms a part of the upper gas header 41, is identical in construction to the damper box b and is formed by front and rear wall members 122, 123, side wall members 124, 125, and bottom wall members 126, secured together to form a hollow rectangular box-like structure open at its top. The front, rear and side wall members are suitably secured together, as by welding, and have outwardly extending flanges formed around their top and bottom edges. The bottom wall member is removably secured to the structure, as by bolting. The side wall members have aligned circular openings formed therein and in which are suitably secured, as by welding, the ends of the sections of the conduit or head 41 (see Fig. 11).

The outlet (inlet) damper box c is secured to the bottom of the multi-damper seat box 35, as by bolting the flanged top end of the damper box to the flanged bottom end of the multi-damper seat box. A flat rectangular plate 127 is mounted between the damper box c and the multi-damper seat box 35 with its peripheral edges secured between the connected flanges of the two boxes. The plate 127 has a circular opening 128 formed therein and provided with a downwardly projecting peripheral flange forming a circular valve seat 129. An oscillatable shaft 130 extends transversely of the damper box c with one end journalled in a suitable bearing formed on the rear wall of the box and with its other end extending through a bushing bearing in the front wall of the box. The shaft 130 carries a spaced pair of parallel crank arms 131 rigidly secured thereto. A circular damper member 132 is connected to the ends of the crank arms 131 for limited pivotal movement, as by means of an apertured lug 133 bolted between the ends of the crank arms. The construction is such that the shaft 130, when turned in one direction, will swing the damper member 132 into engagement with the damper seat, and when the shaft is turned in the other direction, will swing the damper member off the damper seat. The damper member is also provided with a circular gasket positioned to engage the circular damper seat when the damper member is swung to closed position.

The outlet (inlet) damper box a, which forms a part of the upper hot air header 42, is generally similar in construction to the outlet (inlet) damper boxes b and c, and is formed by top and bottom wall members 134, 135, side wall members 136, 137, and a front wall member 138, secured together to form a hollow rectangular box-like structure open at its rear. The top, bottom and side wall members are suitably secured together, as by welding, and having integral outwardly extending flanges formed along their front and rear ends. The front wall member is removably secured to the structure, as by bolting. The side wall members have aligned circular openings formed therein and in which are suitably secured, as by welding, the ends of the sections of the conduit or header 42 (see Fig. 11).

The outlet (inlet) damper box a is secured to the front side of the multi-damper seat box 35, as by bolting the flanged rear end of the damper box to the flanged nipple 106 carried by the front wall of the multi-damper seat box. A flat, rectangular plate 139 is mounted between the damper box a and the damper seat box 35 with its peripheral edges secured between the connected flanges of the two boxes. The plate 139 has a circular opening 140 formed therein and provided with an outwardly projecting peripheral flange forming a circular damper seat 141.

A vertical oscillatable shaft 142 is mounted in the damper box a with one end journalled in a suitable bearing formed on the bottom wall of the box and with the other end extending through the top wall. The shaft 142 carries a spaced pair of parallel arms 143 rigidly secured thereto. A circular damper member 144 is connected to the ends of the arms 143 for limited pivotal movement, as by means of an apertured lug 145 bolted between the ends of the arms. The damper member 144 is also provided with a circular gasket and is swung into closed position in engagement with the damper seat 141 when the shaft 142 is turned in one direction, and into open position out of engagement with the damper seat when the shaft 142 is turned in the opposite direction.

From the foregoing, it is apparent that the multi-damper seat box 35, which communicates with the upper manifold of the reactor by means of the nipple 36, may be placed in communication with any selected one of the conduits or heads 40, 41 and 42, by moving the damper member in the damper box of the selected conduit to open position and simultaneously moving the damper members in the other two damper boxes to closed position.

Suitable means are provided for rotating the shafts carrying the damper members. In the particular embodiment of the invention illustrated, each of the damper member shafts is shown as being connected to a reciprocating air motor 146 by means of a system of levers. Each of the motors and the arrangement of levers connecting it to a damper member shaft is identical in construction and, as shown in Fig. 11, the air motor for oscillating the damper shaft in the $a$ damper box of header 40, comprising a cylinder 147, a piston mounted in the cylinder and having a rod 148 pivotally and slidably connected at one end to one end of a lever 149 fixedly attached to the end of the shaft 116 carrying the damper member, and a pair of pipes 150, 151, communicating with the interior of the cylinder for admitting compressed air thereto on each side of the piston. The pipes are connected, one to the head end and the other to the rod end of the cylinder and are connected in a control system hereinafter to be described, and alternately act as inlet and outlet connections to move the piston first in one direction and then in the other direction. The travel of the piston is such as to move the lever through a 90° arc. This permits the damper members to move through a 90° arc in moving from closed to open position, which results in the damper members being held at right angles to the longitudinal axis of the conduits or headers, thereby permitting them to act as baffles to direct the flow of the fluid into the multi-damper seat box.

The apparatus, and the arrangement thereof for selectively opening and closing the dampers in each of the outlet (inlet) damper boxes is generally similar to that shown in my Patent No. 1,872,783, issued August 23, 1932, for Adsorption Systems, and is diagrammatically shown in Fig. 3. As there shown, the head end pipes 150 of all of the air motors operating the damper members in the $a$ outlet (inlet) damper boxes are connected to a distributor pipe 152 and the rod end pipes 151 of all of the air motors operating the damper members in the $a$ outlet (inlet) damper boxes are connected to a distributor pipe 153. In like manner, all of the head end pipes 150 of all of the $b$ air motors are connected to a distributor pipe 154, and all of the rod end pipes 151 of all of the $b$ air motors are connected to a distributor pipe 155, and the head end pipes 150 of all of the $c$ air motors are connected to a distributor pipe 156 and the rod end pipes 151 of all of the $c$ air motors are connected to a distributor pipe 157.

A source of compressed air, including a motor driven compressor (not shown) and a reservoir tank 158, is connected by a pipe 159 to valves 160, 161 and 162, each also lettered $a$, $b$ and $c$ to indicate their relation to the groups of outlet (inlet) damper box members which they respectively control. Fig. 14 shows in detail, in section, one of these valves. As shown, it is a conventional D valve of the type used in steam engines, and the pipe 159 supplies the chamber 163 with compressed air which is delivered from the port 164 when the valve is in the position shown, while the port 165 is connected to the exhaust passage 166. The D valve 167 is slidable so that it can open the port 165 to the compressed air and associate the port 164 with the exhaust. The D valve is normally held in the position shown in Fig. 14, by means of a spring 168 acting on its stem. The stem extends, as at 169, through the other end of the casing and is connected by means of a centrally pivoted lever 170 to a roller 171 operating on a cam 172. In Fig. 3, three cams are shown on a common shaft 173, each cam having a lobe of substantially 120° extent and each lobe radially spaced from the preceding lobe by 120°. This provides that but one of the valves 160, 161, 162 is open against its spring at any one time and, in Fig. 3, the upper valve 160 controlling the $a$ dampers of the reactors is shown open to permit air to be delivered to the rod ends of the cylinders 146 through the distributor pipe 153, which causes the opening of the damper members in all of the $a$ outlet (inlet) damper boxes. The remaining valves 161, 162 are so held by their springs that the $b$ and $c$ damper members of the reactors are closed, due to air being delivered to the head ends of the cylinders 146 through distributor pipes 154 and 156, respectively, thereby holding the damper members in all of the $b$ and $c$ outlet (inlet) damper boxes in closed position.

The shaft 173 is driven by any suitable timing mechanism 174 which will turn it a third of a revolution at definite intervals, preferably timed by the average length of time necessary to deactivate a reactor, since activation can be performed in this time or less, if necessary.

The arrangement of the reactors so that oxidation takes place in stages, is of particular advantage in that it (1) permits more efficient use of the catalyst; (2) provides for controlling the temperature of reaction by the heat exchangers between the stages; and (3) the nearly complete removal of all traces of sulphur, due to the partially reacted gas from the 1st oxidation stage being passed through a reactor which has just been activated for the 2nd oxidation stage in each group of reactors.

From the foregoing, it readily will be seen that there has been provided novel and improved apparatus for recovering elemental sulphur in liquid form from gases containing H₂S, which provides for carrying out the reaction process in at least two oxidation stages with control of the temperature rise in each stage, thereby permitting the reaction process to be effected at temperature below about 800° F., with resulting increase in efficiency of the process, use of less expensive apparatus, and permitting the use of a catalyst carrier such as silica gel.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A system for recovering elemental sulphur in liquid form from gases containing hydrogen sulphide, comprising in combination, a pre-heater connected to a source of gas to be treated for heating the gas; a series of vertically arranged reactors each adapted to contain a quantity of catalyst capable of effecting the desired catalytic reaction; a heat exchanger; a scrubbing tower; three upper conduits each having a valved connection to the upper end of each of said reactors, a first of said conduits being closed at one end and having its other end connected to said pre-heater, a second of said conduits having one end closed and its other end connected to said heat exchanger, and a third of said conduits having one end open to the atmosphere and its other end closed; three lower conduits each having a valve connection to the lower end of each of said reactors, a first of said lower conduits having one end connected to said heat exchanger and its other end closed, a second of said lower conduits having one end connected to said scrubbing tower and its other end closed, and a third of said lower conduits having one end connected to a source of hot air and its other end closed; a sulphur burner; means including conduits for supplying air and liquid sulphur to the sulphur burner for combustion therein; a conduit having one end connected to the flue gas outlet of said sulphur burner and having branches connected to its other end and to said first and second upper conduits, whereby $SO_2$ produced by the sulphur burner will be mixed with the gas flowing through said first and second upper conduits; and time controlled, automatic means for selectively opening and closing the valves in all of said upper and lower conduits to permit each reactor to follow a predetermined pattern so that each reactor will become in succession a 2nd oxidation zone, a 1st oxidation zone, and a reactivation zone.

2. A system, as set forth in claim 1, including a second pre-heater connected to said scrubbing tower; a second heat exchanger; a second scrubbing tower; a second series of vertically arranged reactors, each of said reactors having valved connections at its upper end to three upper conduits, and having valved connections at its lower end to three lower conduits, a first of the upper conduits being closed at one end and having its upper end connected to said second pre-heater, a second of the upper conduits being connected at one end to said second heat exchanger and having its other end closed, a third of the upper conduits having one end closed and its other end open to the atmosphere; a first of said lower conduits having one end connected to the second scrubbing tower and its other end closed, a second of the lower conduits having one end connected to said second heat exchanger and its other end closed, a third of the lower conduits having one end closed and its other end connected to a source of hot air; additional branch conduits connecting said sulphur burner outlet conduit to said first and second upper conduits of the last named series of reactors; said time controlled means also being connected to operate all of the valves for the second series of reactors in the same manner as the valves in the first series of reactors.

3. A system, as set forth in claim 1, including a blower, and a hot air heater connected to the third of said lower conduits for supplying hot air thereto; and wherein the conduits for supplying air and liquid sulphur to the sulphur burner are connected to the blower and the scrubbing tower, respectively, whereby the blower supplies the air and the scrubbing tower supplies the liquid sulphur for the sulphur burner.

4. A system for recovering elemental sulphur in liquid form from gases containing hydrogen sulphide, comprising in combination, a pre-heater connected to a source of the gas to be treated for heating the same; a heat exchanger; a scrubbing tower; a series of upstanding reactors each adapted to contain a quantity of catalyst capable of effecting the desired reaction; an upper gas header having a valved connection to the upper end of each of said reactors, said upper gas header having one end closed and its other end connected to said pre-heater to permit a flow of pre-heated gas into and through a first selected one of said reactors whereby a first stage of oxidation will take place therein; a lower gas header having a valved connection to the lower end of each of said reactors, said lower gas heads having one end closed and having its other end connected to said heat exchanger to permit the treated gas to flow from the first selected reactor into the heat exchanger; a second upper gas header having a valved connection to the upper end of each of said reactors; said second upper gas header having one end closed and its other end connected to said heat exchanger to permit the treated gas to flow from said heat exchanger into and through a second selected one of said reactors, whereby a second stage of oxidation will take place therein; a second lower gas header having a valved connection to the lower end of each of said reactors, said second lower gas header having one end closed and its other end connected to said scrubbing tower to permit the treated gas to flow from said second selected reactor into the bottom of and upwardly through the scrubbing tower; means, including a pump and conduits, for introducing a counter-current spray of liquid sulphur into the top of the scrubbing tower, whereby the downward current of liquid sulphur will condense the sulphur vapor in the tower; means, including conduits, having one of their ends connected to a source of oxidation gas supply and the other of their ends connected to the respective upper gas headers for mixing oxidation gas with the gas to be treated prior to each of its passages through the reactors; an upper hot air header having valved connection to the upper end of each of said reactors, said upper hot air header having one end closed and its other end open to the atmosphere; a lower hot air header having valved connection to the lower end of each of said reactors, said lower hot air header having one end closed and the other end connected to a source of hot air to permit a flow of hot air into and through a selected one of said reactors whereby the catalyst therein will be reactivated; and time controlled automatic means for selectively opening and closing the valves in all of said headers to permit each reactor to follow a predetermined cycle of operation, so that each reactor will become in succession a 2nd oxidation zone, a 1st oxidation zone, and a reactivation zone.

ERNEST B. MILLER.

No references cited.